UNITED STATES PATENT OFFICE.

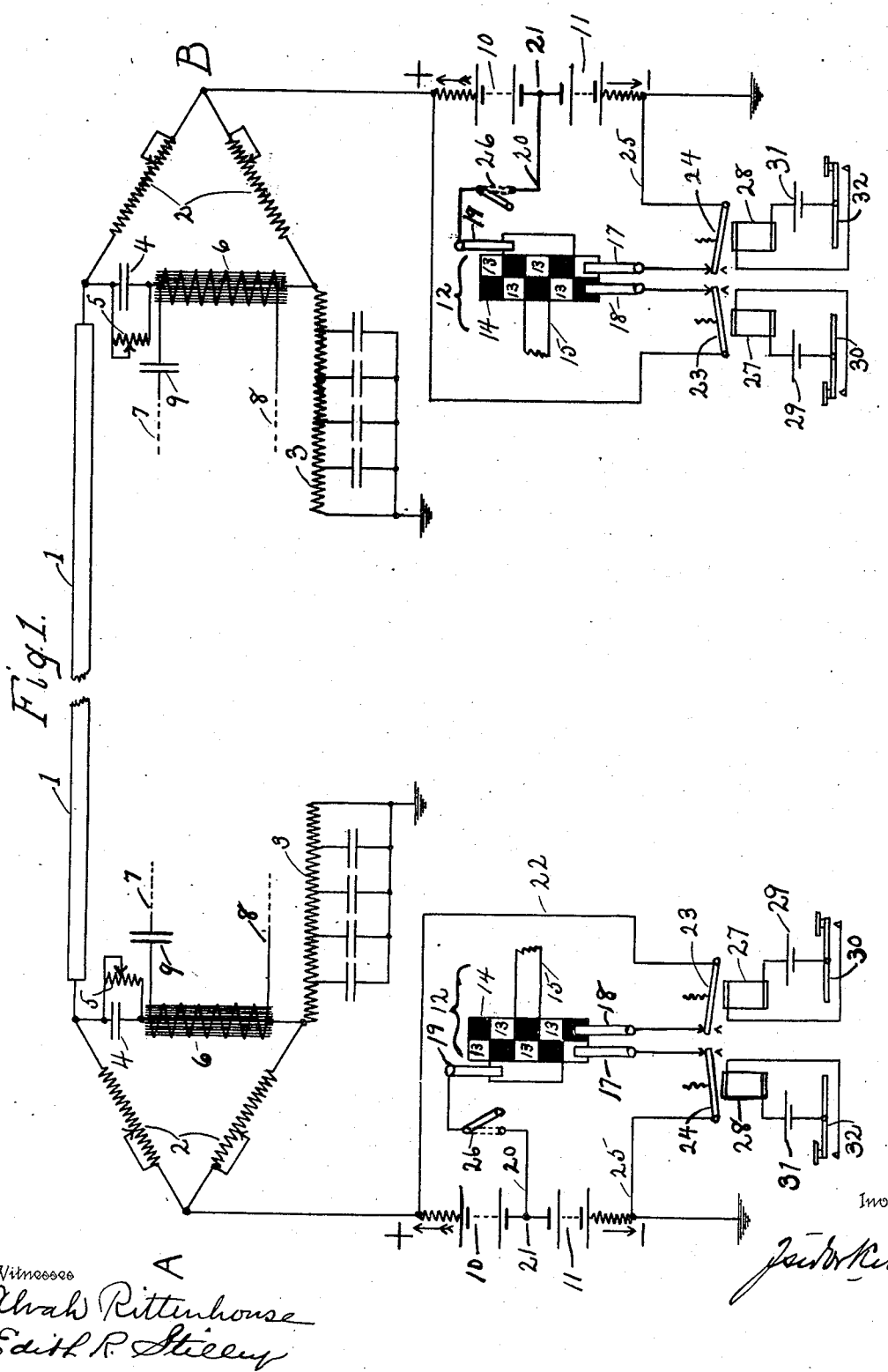

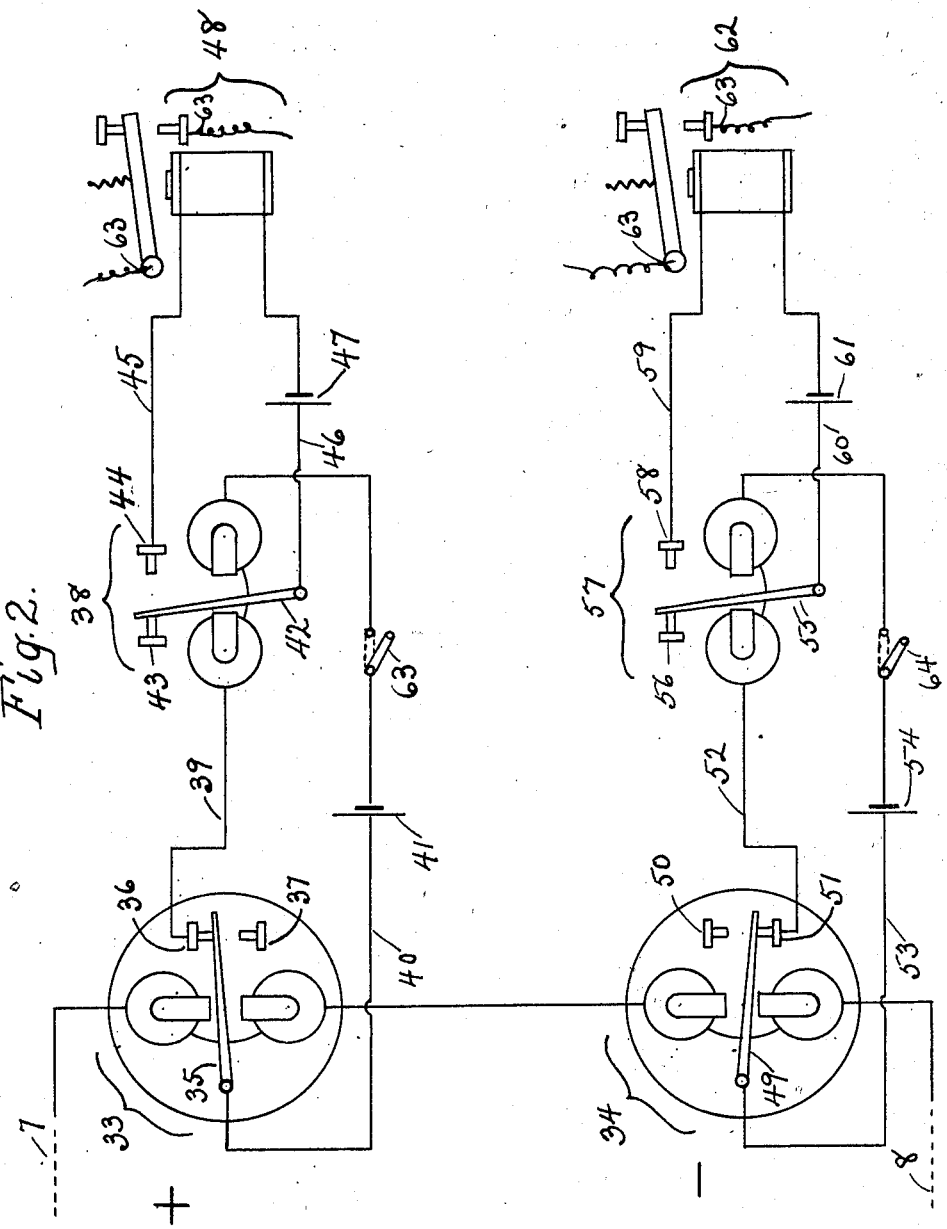

ISIDOR KITSEE, OF PHILADELPHIA, PENNSYLVANIA, ASSIGNOR, BY MESNE ASSIGN-MENTS, TO AMERICAN TELEPHONE AND TELEGRAPH COMPANY, OF NEW YORK, N. Y., A CORPORATION OF NEW YORK.

QUADRUPLEX TELEGRAPHY.

1,218,413.   Specification of Letters Patent.   Patented Mar. 6, 1917.

Application filed October 1, 1910, Serial No. 584,858. Renewed December 30, 1916. Serial No. 139,961.

*To all whom it may concern:*

Be it known that I, ISIDOR KITSEE, citizen of the United States, residing at Philadelphia, in the county of Philadelphia and State of Pennsylvania, have invented certain new and useful Improvements in Quadruplex Telegraphy, of which the following is a specification.

My invention relates to an improvement in quadruplex telegraphy and may be applied to overhead as well as underground lines, but its great value is most apparent on lines with great capacity, such for instance as submarine cables, and I will here describe my invention as applied to such cables.

The object of my invention is to produce a simple and efficient arrangement for quadruplexing telegraphic lines.

For the purpose of illustrating one of the forms my invention may take, I have reference to the accompanying drawing, which illustrates a quadruplex system applied to a submarine cable.

In the drawing: Figure 1 is a diagrammatic view of my invention applied to a cable and Fig. 2 is a diagrammatic view of the receiving organism for one terminal of said cable.

In this drawing; 1, 1, is the cable; A is the organism at one terminal of the cable and B the organism at the other terminal of the cable. The devices and arrangement of same are alike at both terminals and similar parts at one terminal are designated by similar numbers of the other terminal.

I will describe the organism of the terminal A and functions of the different parts of same, it being understood that the functions of the different parts of organism B are alike in their action and result.

In this organism, 2 is the bridging arrangement with the aid of which the home relays are made silent to the home impulses. This bridge is connected, as usual, at one point to the cable 1 and at the other point to the artificial line 3.

In cable telegraphy, it was found that to overcome the variations due to the large capacity of the cable, it is necessary to provide the circuit comprising the line relays with different devices, and in this drawing, I have provided the cross wire of the bridge to which the line relays are connected with the following instrumentalities:—a condenser 4 shunted by a resistance 5 and an impedance coil 6 in series to said condenser. To the terminal of said impedance coil is connected the circuit embracing the line relays. The circuit wires are designated as 7 and 8, respectively, and in this circuit is inserted the condenser 9. To the junction of the wires of the bridge 2 are connected the two sources of current 10 and 11. In the drawing, each source is shown as to comprise only two cells, but it is obvious that, in practice, the number of cells has to be greatly increased and I have found that to telegraph successfully over a line having about two million K. R., a battery of from thirty to forty volts is required.

12 is a commutating device as an entirety comprising the commutator proper consisting of the conducting parts 13 and the nonconducting parts 14 and consisting of the shaft 15 in contact with the conducting parts 13.

17 and 18 are the commutating brushes. 19 is a brush normally in contact through the shaft 15 with the conducting parts 13. This brush is connected through wire 20 with the interposition of switch 26 to the point of junction 21 connecting the two sources 10 and 11 in opposition as to each other.

27 and 28 are two electro-magnets, the electro-magnet 27 connected with the interposition of the source of current 29 to key 30 and the electro-magnet 28 connected with the interposition of the source of current 31 to key 32. Both of the keys 30 and 32 are normally open.

The commutating brush 18 is connected with the interposition of the armature 23 of electro-magnet 27 to wire 22 and this wire is connected to one pole of the source of current 10. The commutating brush 17 is connected through armature 24 of electromagnet 28 to wire 25 and this wire is connected to one pole of the source of current 11.

The shaft 15 and, therefore, the commutating wheel connected to said shaft may be rotated by any of the well known means—mechanical or otherwise,—but it is preferred that the rotating means should consist of a motor, as the speed regulation of an electric motor is readily accomplished. In actual use, the motor is regulated so that the reversals impressed upon the line should be of the highest possible number compatible with the perfect operation of the line-relays and this speed should not fall low enough to give the relay tongue a period of rest greater than the predetermined period during the working time of the commutator at the far off station.

The number of pulses of which a relay can take care of is greatly augmented if these pulses are part of true reversals.

In tests made on a submarine cable, running from New York, N. Y. to Canso, N. S., it was found that with true reversals, the number of pulses may be more than doubled without over-taxing the working of the relay inserted in the cable.

As long as the switch 26 of the circuit including the brush 19 is open, the shunt of both of the sources 10 and 11 is broken, but when the switch 26 is closed, as is shown in the drawing in dotted line, and when the shaft 15 revolves, the brushes 17 and 18 alternately touch the conducting parts 13 and the insulating parts 14 of the commutator wheel. When the brush 18 touches the conducting part 13, a shunt circuit is established including conducting part 13, brush 18, armature 23 of electro-magnet 27, wire 22, source of current 10, point of junction 21, wire 20, switch 26 and brush 19. Through this short circuiting, the force opposing the source of current 11 is removed and the current from this source will flow over the line in the direction of the unfeathered arrow. When, now, in the course of the revolution of the commutating wheel, the brush 18 comes to contact with one of the insulating parts 14, as is illustrated in the drawing, the brush 17 will come in contact with one of the conducting parts 13, as is also illustrated in the drawing, and through this change, the circuit formerly shunting the source 10 is broken and a circuit is established shunting the source 11. This circuit includes the conducting part 13, brush 17, armature 24 of electromagnet 28, wire 25, source 11, point 21, wire 20, switch 26 and brush 19. Through the short circuiting of the source 11, the force opposing the source 10 is removed and the current from the source 10 will flow over the cable in the direction of the feathered arrow and as the commutator revolves continuously at a predetermined speed, it is obvious that alternately the sources from 10 and 11 are free to impress pulses upon the line and, therefore, true reversals will be transmitted as long as the commutator continues to revolve. The pulses will flow over the bridge dividing there in equal proportion, will flow then over the line or cable 1, 1, and will flow through the cross wire of the bridge at the far off station and there actuate the devices connected to said cross wire.

I have not shown the receiving organism in this figure but I have illustrated the organism of one terminal in Fig. 2.

In this figure, I have illustrated the line-relays in conventional sign and in conventional form, but it is obvious that on submarine cables, more especially if the same are of considerable length, relays of special types have to be employed for the purpose of having them actuated by the weak currents arrived, but I deem it unnecessary to go into detail of such relays and it suffices to say that any relay adapted to be operated on cables with large capacity may be employed with this, my invention.

In this figure, the wires 7 and 8 are a continuation of the lines 7 and 8, as illustrated in Fig. 1. It is, therefore, seen that the receiving organism, as illustrated in Fig. 2, is inserted in the cross wire of the bridge of Fig. 1 and is in multiple arc as to the impedance 6 of Fig. 1 in said cross wire.

In Fig. 2, 33 is a polarized relay with the biased armature 35. 36 and 37 are the two stops. It is supposed that the armature normally rests, as is shown in the drawing, at the forward stop 36. 38 is a second polarized relay, of which 42 is the biased armature and 43 and 44 the two stops. This armature is supposed to normally rest on the forward stop 43 as illustrated. 48 is a translating device, here shown as a sounder. The armature 35 of the relay 33 is connected through wire 40 with the interposition of the source of current 41 and, preferably, as shown here, the switch 63 with one terminal of the coil of the relay 38. The other terminal of this coil is connected through wire 39 with the forward stop 36 of relay 33. The armature 42 of relay 38 is connected through wire 46 with the interposition of the source of current 47 to one terminal of the coil of the translator 48. The other terminal of said coil is connected through wire 45 with the stop 44 of relay 38. 34 is a second line-relay connected here in series with the line relay 33. The relay 34 is also of the polarized type and is provided with the two stops 50 and 51. Its biased armature 49 is supposed to rest normally, as is shown in the drawing, on forward stop 51. 57 is a polarized relay provided with the two stops 56 and 58 and its biased armature 55 rests normally on the forward stop 56. 62 is a translator here shown as a sounder, but it is obvious that the translator 62 as well as the translator 48 may be of any desired or well known type and may also be provided with means to relay to a second line. These means are here shown in both cases as wires 63.

The armature 49 of the relay 34 is connected with the interposition of the source of current 54 and switch 64 with one terminal of the coil of relay 57, the other terminal is connected through wire 52 with forward stop 51. The armature 55 of relay 57 is connected through wire 60 with the interposition of the source of current 61 to one terminal of the coil of the translator 62, the other terminal of said coil is connected through wire 59 with forward stop 58.

I have above described the relays 33, 34, 38 and 57 as "biased" relays. To produce these results, it is only necessary to tilt the relays to a very slight degree. In biasing polarized relays, such procedure is very frequent and well understood. Another method of biasing these relays is to place one pole piece nearer to the center than the other pole piece and persons versed in the art well understand that springs, as usually employed in neutral relays, are not a necessity for the biasing of polarized relays.

The operation of the system, as illustrated in Figs. 1 and 2 and above described, is as follows:—

When all the switches are closed and the motors at the different terminals set in motion, the sources 10 and 11 at the terminal A will be alternately short circuited and reversals, true in their character, (if the sources are of equal electromotive force) are impressed upon the line from the terminal A, so also will the sources 10 and 11 of the terminal B be alternately short circuited and true reversals be impressed upon the line from this terminal. The reversals impressed at the terminal A will actuate the line relays at terminal B and the reversals impressed at terminal B will actuate the line relays at terminal A,—the bridge arrangement making ineffective the line relays to the home reversals. Through the impressing of the reversals on the line from both terminals, the armatures of both relays at both terminals will vibrate in accordance with the impulses of the reversals. In this system, it is of great importance that these vibrations should not affect the translating device. Two methods can be employed for the purpose of making the translator insensible to these rapid vibrations. One of the methods is to make the core of the translator of an unusual and extraordinary amount of iron and provide this core with an unusual number of turns of wire for the purpose of increasing the reluctance to the quick changing of the magnetizing action.

The second mode is to introduce between the line relay and the translator an instrument—relay or a like device—, the armature of which requires a certain and predetermined time unit to pass from one forward stop to the other forward stop. By preference, I make use here of both of these methods.

I insert between the line relay and the translator a second relay and I also make the translator more reluctant than usual. The second relay is also a necessity when the line relay is of great sensitiveness for the reason that a translator of a type as required needs an amount of current in its circuit which the delicate line relay is not able to furnish without undue sparking and sticking.

It is true that in the drawing I have only shown one cell in the circuit connecting the translators to the armatures of the intermediate relay, but it is obvious that a greater number of cells is required and this number must vary in accordance with requirements.

Normally, when the reversals are transmitted from each terminal without interruption, the line relays at each terminal will respond and the armatures of same will vibrate, but at a speed which will not affect or drive to activeness the translators.

For better understanding, it is necessary to state that one of the line relays at each terminal answers only to a positive impulse and the second of said line relays answers only to a negative impulse.

It is supposed that the line relay 33 is made active through positive and the line relay 34 is made active through negative pulses.

It is now supposed that the operator at key 30 of terminal A desires to transmit messages. He depresses his key in the usual manner,—a short time for a dot and a longer time for a dash. As soon as the lever of this key comes in contact with its lower stop, a circuit is established including the source 31 and the coil of electro-magnet 28, thereby energizing the core and drawing the armature 24 from its resting place. The means, therefore, to short circuit alternately the source 11 are interrupted and the commutator in the progress of its travel will only short circuit the source 10 but will not be able to close the short circuit of source 11. Instead, therefore, of impressing upon the line reversals consisting alternately of positive and negative impulses, there will be impressed upon the line only impulses from the source 11 flowing in the direction of the unfeathered arrow and I call these impulses the "negative" impulses. This ceasing of the flow of the positive impulses will result at the far off station, i. e. at the terminal B, therein that the relay 33 which answers only to positive impulses will become inactive and its armature which formerly vibrated between the stops 36 and 37 will come to rest at 36 for a period equal to the time of depression of the key 32. This time is sufficient to throw the armature 42 of relay 38 from its resting place toward and in contact with 44 and is sufficient to energize the core of the translator 48 in a manner so as to draw down its armature and translate the closing time of the key 32 into a dot or dash, as the case may be.

It is now supposed that the operator at key 32 has ceased to transmit messages and that the operator at key 30 is desirous of transmitting messages. He also depresses the key in the usual manner,—for a short time to denote a dot and for a longer time to denote a dash. The closing of the key 30 will result in the energizing of the electromagnet 27. The armature 23 will, therefore, be drawn from its resting point and the means to shunt or short circuit the source 10 are now interrupted. The commutator, in its revolution, will, therefore, only be able to short circuit the source 11 but will not be able to short circuit the source 10. Instead, therefore, of impressing upon the line "reversals" only impulses from the source 10 will be impressed. These impulses will flow in the direction of the feathered arrow and I call these impulses the "positive" impulses. At the far off station, the line relay 34 which answers only to negative impulses will become inactive and its armature 49, which formerly vibrated between the stops 51 and 50, will come to rest at its normal resting place 51 for a time coinciding with the closing time of the key 30 and this time will suffice to throw the armature 55 of relay 57 toward and in contact with the stop 58 and will suffice to magnetize the core of the translator 62 in a manner so as to draw the same in contact with the lower stop.

It is now supposed that the operators of both keys 30 and 32 desire to transmit messages at one and the same time. It is also supposed that the keys 30 and 32 are simultaneously closed. Through the closing of both keys, the means to short circuit the sources 10 and 11 through the commutator 12 are simultaneously interrupted and no current will flow over the line from the terminal A. At the far off terminal B, both line relays 33 and 34 will become inactive for the reason that no positive pulse will arrive to actuate the line relay 33 and no negative pulse will arrive to actuate line relay 34. The armatures of both relays will, therefore, remain at their normal resting stop for a time long enough to throw the respective armatures of the relays 38 and 57 toward and in contact with their respective forward stops 44 and 58. The result will be that both translating devices—48 as well as 62—will become active and each will translate the time of rest of its line relay and as this time of rest coincides with the closing time of its key, it follows that each translating device will be active to denote a dot or dash in accordance with the longer or shorter closing time of its key at the far off station.

The same operations will produce the same results, if one or the other or both operators of terminal B desire to transmit messages.

It is now supposed that all four operators of all four stations, i. e. the two stations at the terminal A and the two stations at the terminal B, desire to transmit messages and it is supposed that all four keys are simultaneously depressed. Through the depression of all four keys, the means for short circuiting any of the batteries, either at A or B, are interrupted, and as the batteries at A as well as B are in opposition as to each other, no current will flow over the line and both relays at the terminal A as well as both relays at the terminal B will become inactive and will remain inactive as long as the four keys are closed. If it happens that one key—say key 32 of terminal A—should be open during the time that the other keys remain closed, the result would be that the relay of the far off station coinciding with the key 32, i. e. relay 34, will become active and its translator will become silent, thereby indicating that its transmitted character has ended.

Having now described my invention, what I claim as new and desire to secure by Letters Patent is:—

1. The method of telegraphically quadruplexing lines with great capacity, which consists in normally impressing upon a line true reversals at both terminals of the line, depressing positive pulses to operate translating devices of one far off station, depressing negative pulses to operate translating devices of the second far off station and depressing both pulses to operate the translating devices at both far off stations simultaneously.

2. In telegraphy, the method of translating messages which consists in causing one of two normally active translators to remain silent when a positive pulse is received, causing the second of said two translators to remain silent when a negative pulse is received, causing both translators to become active during the time that no pulse is received, and causing each of said translators to retard the operation of said translators.

3. A telegraphic quadruplex system comprising for each terminal two stations, means for each terminal to impress upon the line true reversals, means for one station of each terminal to depress the positive pulse of said reversals, means for the second station of each terminal to depress the negative pulse of said reversals; a line relay for each station of each terminal, translating devices for said line relays and means for each of said translating devices to retard the operation of said translating device.

4. In a quadruplex telegraphy, the method which consists in causing the translators of each of four stations to be normally active when no current is flowing over the line, causing any one only of said relays to become passive by suppression of polarities, and causing each of said relays when passive to render active a translating device.

5. A system of quadruplex telegraphy comprising the line of transmission, two stations for each terminal of the line, means at each terminal of the line to impress upon said line true reversals, said means common to both stations of each terminal, means for one station of each terminal to depress the positive pulses of said reversals, in accordance with the signals to be transmitted, means for the second station of each terminal to depress the negative pulses of said reversals in accordance with the signals to be transmitted, a polarized line-relay answering to positive pulses for one station of each terminal, a polarized line-relay answering to negative pulses for the second station of each terminal, a local circuit and translating devices for each line-relay and means operatively related to said translating devices to make operative said devices only during the time that the line-relays are inoperative.

6. In a system of quadruplex telegraphy for a submarine cable, a bridge for each terminal of said cable, an artificial line for each bridge, two polarized relays with biased armatures in each of said bridges, one of said relays answering to positive and the second of said relays to negative pulses; a local circuit and translating device for each of said relays, means for each of said translating devices to become active only during the time that its relay becomes passive, means for each terminal to transmit true reversals and means for one station of each terminal to depress the positive pulse and means for the second station of each terminal to depress the negative pulse of said reversals in accordance with the signals to be transmitted.

7. In a system of quadruplex telegraphy for a submarine cable, two transmitting stations for each terminal of said cable, two sources of current normally connected to the line but in opposition as to each other for each terminal, means at each terminal to automatically and alternately short circuit one or the other of the sources of its terminal, one polarized line-relay for each station of each terminal, a local circuit for each of said line relays, a translator for said local circuit and means for said translator to make the same passive when its relay is active and to make the same active when its relay is passive.

8. In a system of quadruplex telegraphy, a line of transmission, means to impress at each terminal reversals upon said line, two polarized relays for each terminal, one of said relays adapted to be operated by the positive pulses and the other of said relays adapted to be operated by the negative pulses impressed at the far off station on said line, a local circuit for each of said relays, a translating device for each of said local circuits and means for each of said translating devices to make operative said translating device only during the time that its own relay is inactive.

In testimony whereof I affix my signature in presence of two witnesses.

ISIDOR KITSEE.

Witnesses:
EDITH R. STILLEY,
MARY P. SMITH.